Sept. 8, 1931.  C. W. KANOLT  1,822,489
REGISTERING DEVICE
Filed June 21, 1929   3 Sheets-Sheet 1

Inventor
Clarence W. Kanolt
By Vernon E. Hodges
Attorney

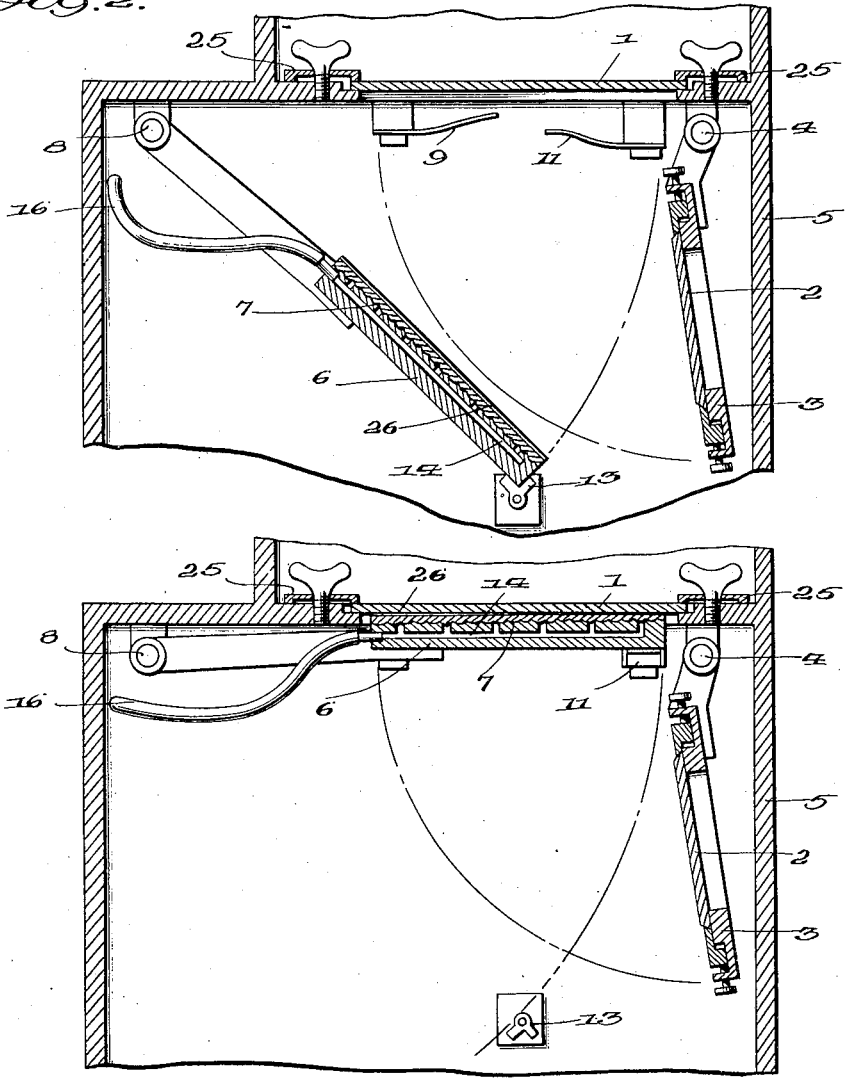

Inventor
Clarence W. Kanolt
By Vernon E. Hadger
his Attorney

Patented Sept. 8, 1931

1,822,489

UNITED STATES PATENT OFFICE

CLARENCE W. KANOLT, OF NEW YORK, N. Y.

REGISTERING DEVICE

Application filed June 21, 1929. Serial No. 372,738.

This invention relates to a registering device for the production of changeable pictures of the type set forth in my prior Patents No. 1,150,374, of August 17, 1915 and No. 1,260,682, of March 26, 1918. Such changeable pictures are stereoscopic and may be either opaque or transparent, although the invention is described primarily in connection with opaque stereoscopic pictures.

An opaque changeable or stereoscopic picture would consist of a sheet of celluloid (or other transparent material) having its front surface ribbed to form cylindrical lenses and having a positive opaque picture of the stereoscopic type on or adjacent to its rear surface.

A difficulty in the production of such changeable pictures of large size is that of obtaining precise registry between the ribbed celluloid and the positive picture. For instance, the positive may be printed on ordinary photographic paper and then cemented to the celluloid. But the paper is likely to change its dimensions in the ordinary photographic process of developing, fixing, washing and drying, and even if means are employed to restore it to the correct dimensions, it is likely to be difficult or troublesome to cement it to the celluloid in precise registry unless the picture is small.

To overcome these difficulties I propose to coat the back of the celluloid sheet with a sensitive photographic film, and to print the positive picture directly upon this film from a negative registered properly with the cylindrical lenses on the celluloid.

In order to print from a negative onto a film on the back of the celluloid as I propose, it is very desirable to have some device for insuring precise registry of the negative with the cylindrical lenses of the celluloid, without the use of light in such a way as to injure the film. This is provided in my invention.

In the accompanying drawings:

Figs. 2 and 3 represent partial vertical sections of the same device with the parts in different positions;

Figure 1:
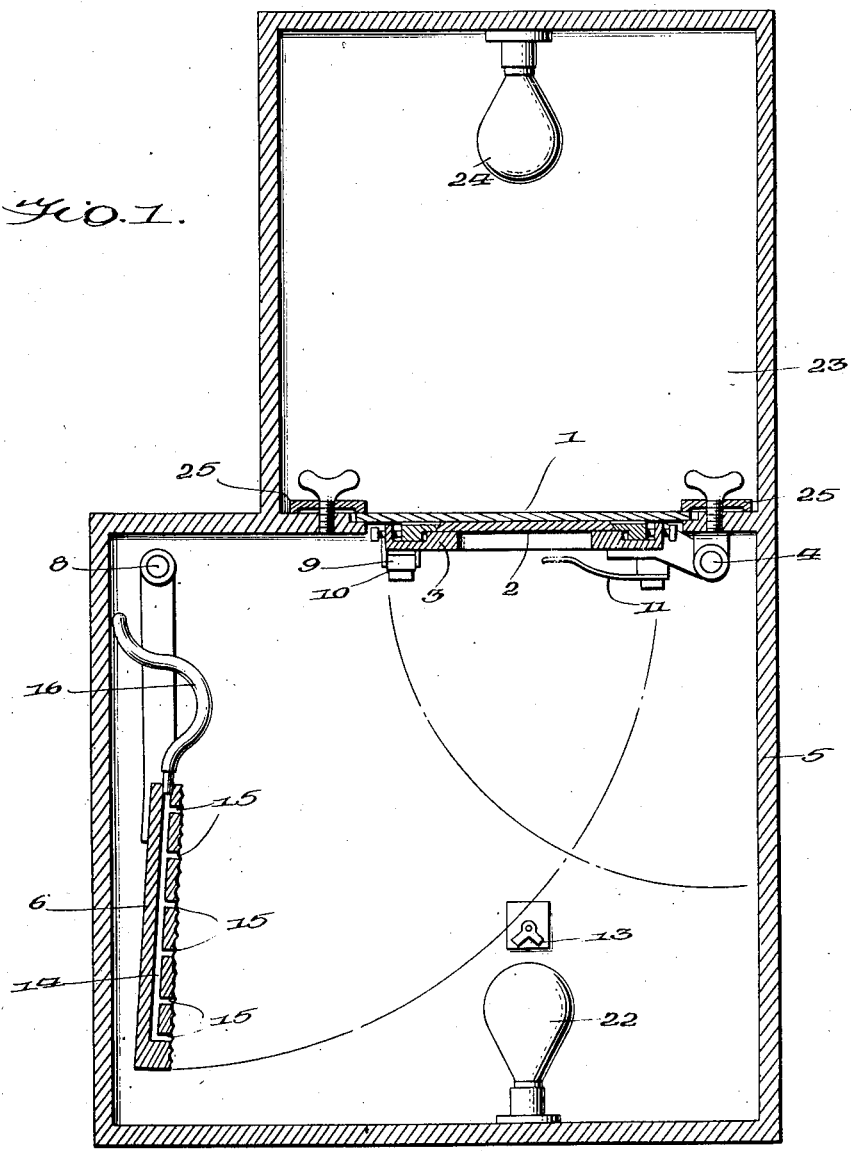
Fig. 1 represents a vertical cross section of the device.

At 11 is a similar movable spring pivoted as at 12 and is used to hold the support 6 with the ribbed celluloid 7 in the horizontal position. At 13 is a catch attached to the rear wall of the box by which the celluloid support 6 may be held in the position shown in Fig. 2 while the celluloid sheet is being put into place.

In order to hold the celluloid 7 in place on the grooved support 6 before it has been raised to the horizontal position it may be desirable to use a vacuum or suction device, as illustrated. Whether this is desirable will depend on how much tendency the celluloid has to curl. The support 6 has inner channels as at 14 with several openings 15 extending therefrom to the grooved surface. These channels 14 are connected by a flexible hose 16 through a valve to a vacuum or suction pump (not shown). After the celluloid has been placed on its support, it may be held in position by the application of vacuum or suction.

Figures 6, 7:
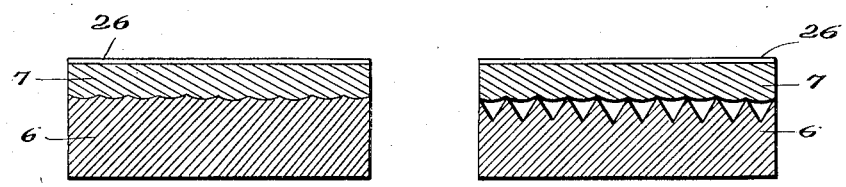
Fig. 6 shows an enlarged cross section of the ribbed celluloid in position on its support.
Fig. 7 shows a cross section of the ribbed celluloid on a different kind of support.

If the vacuum or suction is to be used, it is desirable that the grooves in the support 6 should fit closely the ridges in the celluloid, as shown in Fig. 6. If the vacuum or suction is not to be used, the ridges may be of some other shape, perhaps more conveniently machined, as in Fig. 7.

Figure 4:
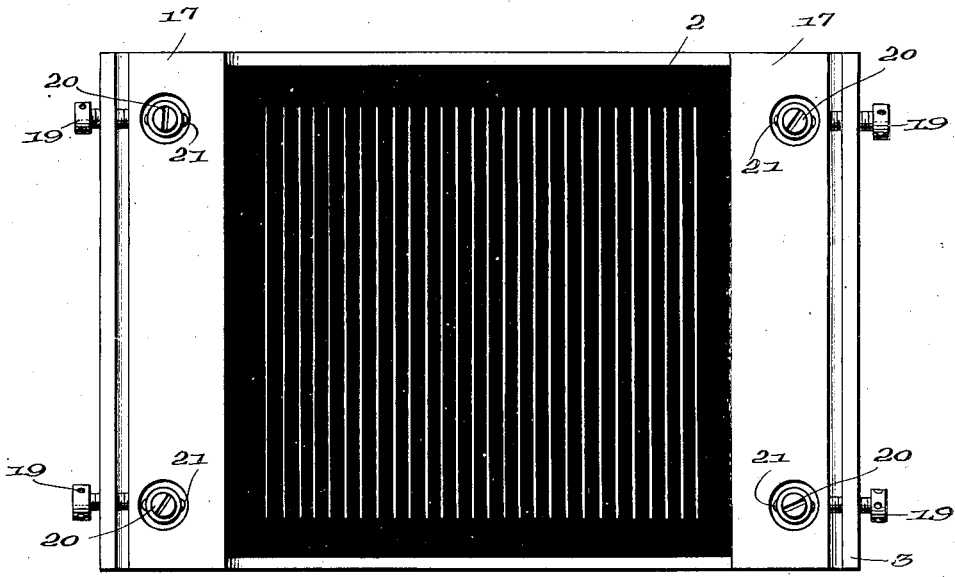
Fig. 4 is a plan view of the device for holding the lined screen.
Figure 5:
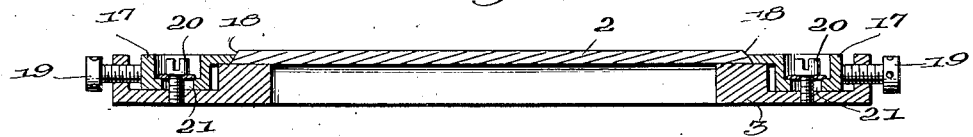
Fig. 5 is a vertical transverse section of the same device.

It is desirable that the lined screen 2 should be held in its support 3 in such a way that its position can be accurately adjusted. How this can be done is shown in Figs. 4 and 5.

In the method here illustrated, the lined screen 2 is held in place by the clamps 17. The edges of the screen adjacent to the clamps are beveled as shown at 18, and the clamps are shaped to fit these beveled edges. The position of the screen can be shifted by turning the screws 19; and the clamps 17 can be held in position by the screws 20, which pass through slotted holes 21 in the clamps 17 into the support 3. The central portion of the support 3 is left open so that light can pass through it. In Fig. 4 the white lines are drawn heavier in the central portion where they may be illuminated from below.

Located in the bottom of the box 5 is an electric lamp 22, or other source of illumination, while in the upper portion 23 of the box or casing 5 is another lamp 24 for illuminating and exposing the opposite sides of the negative and screen.

The position of the lined screen 2 on its support 3 is so adjusted that when the screen and its support are raised to the horizontal position shown in Fig. 1, each transparent line of the screen occupies the same position as the top of one of the ridges in the support 6 occupies when it is raised to the horizontal position, as in Fig. 3. This adjustment may be made by placing two compound microscopes with cross-hairs in their eyepieces in a vertical position above the celluloid support 6, when raised to a horizontal position, and are focused with the cross-hairs over the same ridge in the support. Then by lowering the support 6 and raising the lined screen 2, the microscopes may be focused on the latter by adjusting the screen so that one of the lines of the screen is exactly under the cross-hairs of the microscopes. This adjustment may be done once for all when the apparatus is set up.

The negative 1 is placed in the position shown and the lined screen 2 is placed in contact below it as in Fig. 1. The negative and screen are viewed from above by light transmitted from the lamp 22 and the negative is so registered with the lined screen that the division lines between the picture strips in the negative are opposite the transparent lines in the lined screen. It can readily be determined when this registration is obtained by the appearance of the negative as seen by the light passing through the screen. The negative is fixed in position by means of the clamps 25.

With the lamps 22 and 24 turned off and with no other source of light except perhaps light of any kind that will not materially affect the photographic surface, the ribbed celluloid 7 with its photographic sensitive film 26 which coats the back thereof turned uppermost is placed on the support 6 with the ribs of the celluloid fitting into the grooves in the support, the support meanwhile being in some convenient position as in Fig. 2. The support 6 with the celluloid 7 is then raised until the photographic surface is in contact with the negative as in Fig. 3, the lined screen 2 having been lowered away from the negative. The ribs of the celluloid 7 are then in proper registry with the picture strips of the negative 1.

The lamp 24 is then turned on a sufficient length of time to properly expose the photographic surface 26 under the negative 1.

The celluloid is then removed from the apparatus and its photographic surface is developed and fixed.

It will be understood that although I have described in detail a particular mechanical arrangement of the parts of this device, many other arrangements are possible. Thus, instead of the lined screen and the celluloid support being hung on hinges below the plane of the negative, they might be placed upon a support moving horizontally on a track under the negative with means of raising each successively upward under the negative, or means of moving the negative downward onto each successively.

This device is intended primarily for use in producing stereoscopic pictures. However, it may also be used for changeable pictures that are not stereoscopic. It may also be used in making transparent stereoscopic pictures, and is not to be limited to those which are opaque.

The lined screen 2 may be replaced by a sheet of ribbed transparent material with the ribbed surface downward, if desired. This material should be so shaped that light reaching it from the lamp 22 below is focused on the surface of the negative 1. If this ribbed material requires additional stiffness, it may be supported on a sheet of clear glass.

In the making of opaque stereoscopic pictures on celluloid, having a photographic coating on the back, after the photographic image has been developed and fixed, the picture should be backed with some opaque white or light colored material such as paper or paint. This reflects the light that falls from the front onto the clear spaces of the photographic image, and renders the image more clearly visible.

In the drawings, the size of the ridges on the celluloid and its support is exaggerated for the sake of clearness.

The general principles of the registering device are presented by Figs. 1, 2 and 3. The negative is designated by the numeral 1. This negative may be made in accordance with my former Patent No. 1,260,682, March 26, 1918, and comprises the exposure of a sensitized surface through a lined screen to an object while relatively moving the sensitized surface and lined screen. At 2 is shown a lined screen consisting of a sheet of glass or other suitable material carrying alternate opaque and transparent lines, as shown in Fig. 4, the number per inch being the same as in the lined screen used in the camera in which the negative was produced. The screen 2 is carried on a support 3, hinged or pivoted as at 4 within a box or casing 5. At 6 is illustrated a support having a grooved surface adapted to hold the ribbed celluloid sheet (or similar material) 7 in a definite position. The support 6 is hinged at 8 within the casing 5 on the opposite side from the pivot 4.

The box 5 is more or less open in front and carries the apparatus. At 9 is a movable spring capable of being turned on its support 10. When the spring is turned forward as in Fig. 1 it is used to hold the lined screen support 3 in its horizontal position. When the spring is not required it may be turned back against the back wall of the box, as in Fig. 2. When the lined screen is not in use it may be allowed to hang down as in Figs. 2 and 3.

I claim:

1. The process of making changeable pictures including forming ridges on a face of a sheet of material, coating the opposite side with photographically sensitive material, and printing from a negative directly on the sensitized surface.

2. The process of making changeable pictures including forming magnifying ridges on a face of a sheet of transparent material, coating the opposite face with photographically sensitive material, and printing directly upon the sensitized surface from a negative.

3. The process of making changeable pictures including placing a sheet of photographic material having a grooved surface and a sensitized surface in opposed relation with a negative with the sensitized surface toward the negative, and printing directly on the sensitive surface of the material, by passing light through the negative.

4. The process of making changeable pictures including arranging in opposed relation a negative and a sheet of ribbed transparent material having a sensitive photographic coating opposite the ribs, the sensitive coating being faced toward the negative, and printing on the sensitive surface by passing light through the negative.

5. The process of making stereoscopic pictures comprising registering a negative with a lined screen, holding in opposed relation to the negative a ribbed photographic sheet, and so placed that its ribs have the same relation as the lines of the lined screen had when registered with the negative.

6. The process of making stereoscopic pictures comprising registering a negative with a lined screen, holding in opposed relation to the negative a ribbed sheet having a sensitized surface, said sheet being so placed that its ribs have the same relation as the lines of the lined screen had when registered with the negative, and printing on the sensitized surface.

7. The process of making stereoscopic pictures comprising registering a stereoscopically produced negative with a lined screen, removing the lined screen, holding in opposed relation to the negative a ribbed sheet having a sensitized surface, said sheet being so placed that its ribs have the same relation as the lines of the lined screen had when registered with the negative, and printing on the sensitized surface.

8. The process of making changeable stereoscopic pictures including registering a negative with a lined screen, holding in opposed relation to the negative the sensitized surface of a sheet of ribbed transparent material, the transparent material being so placed that its ribs have the same relation as the lines of the lined screen had when registered with the negative, and printing on the sensitive surface by passing light through the negative.

9. The process of making changeable stereoscopic pictures including orienting a stereoscopic negative to register with a lined screen, removing the lined screen, holding in contact with the negative the sensitized side of a sheet of ribbed transparent material which has been given a sensitive photographic coating on the side opposite the ribs, the transparent material being so placed that its ribs have the same orientation as the lines of the lined screen had when registered with the negative, and printing on the sensitive surface by passing light through the negative.

10. A device of the character described including means for holding a negative, adjustable means for holding a lined screen in a definite orientation relative to the negative, and adjustable means for supporting a sheet of ribbed transparent material in an orientation corresponding to that of the lined screen when registered with the negative.

11. A device of the character described including means for holding a negative, pivotally mounted means for holding a lined screen in a definite orientation relative to the negative, a sheet of transparent material having magnifying ridges on one face and the opposite face coated with photographically sensitive material, and means for pivotally supporting said sheet of transparent material to move said material into proper registry with the negative.

12. A device of the character described including means for holding a negative, pivotally mounted means for holding a lined screen in a definite orientation relative to the negative, a sheet of transparent material having magnifying ridges on one face and the opposite face coated with photographically sensitive material, and means for pivotally supporting said sheet of transparent material to move said material into proper registry with the negative, with the sensitive surface next to the negative, and the transparent material being in an orientation corresponding to that of the lined screen when it was in registry with the negative.

13. A registering device comprising means for supporting a negative, adjustable means for holding a lined screen in opposed relation to the negative and permitting removal thereof from such position, and adjustable means for holding a ribbed sheet in a position corresponding to that of the lined screen.

14. A registering device comprising means for supporting a negative, adjustable means for holding a lined screen in registry with the negative and permitting removal of the lined screen from said registering position, and adjustable means for holding a ribbed sheet in a position corresponding with the registering position of the lined screen.

15. A registering device comprising means for holding a negative, and an adjustable support for holding a ribbed sheet in opposed relation to the negative, said support having a grooved surface to receive the rib of the sheet, and means for holding said sheet in position on the grooved surface.

16. A registering device comprising means for holding a negative, and an adjustable support for holding a ribbed sheet in opposed relation to the negative, said support having a grooved surface to receive the ribs of the sheet, said support having openings therein extending to the grooved surface to apply suction to the ribbed sheet when in place thereon to hold said sheet against removal.

In testimony whereof I affix my signature.

CLARENCE W. KANOLT.